(12) United States Patent
Kalach et al.

(10) Patent No.: US 7,548,939 B2
(45) Date of Patent: *Jun. 16, 2009

(54) GENERATING STORAGE REPORTS USING VOLUME SNAPSHOTS

(75) Inventors: Ran Kalach, Bellevue, WA (US); James R. Benton, Seattle, WA (US); Paul Adrian Oltean, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

This patent is subject to a terminal disclaimer.

(21) Appl. No.: 11/107,119

(22) Filed: Apr. 15, 2005

(65) Prior Publication Data

US 2006/0235892 A1    Oct. 19, 2006

(51) Int. Cl.
*G06F 17/30* (2006.01)

(52) U.S. Cl. .................................. 707/203; 707/205

(58) Field of Classification Search ......... 707/200–206, 707/1–10, 100–104.1
See application file for complete search history.

(56) References Cited

U.S. PATENT DOCUMENTS

| | | | | |
|---|---|---|---|---|
| 6,119,131 | A * | 9/2000 | Cabrera et al. | 707/203 |
| 6,421,684 | B1 * | 7/2002 | Cabrera et al. | 707/200 |
| 6,591,011 | B1 * | 7/2003 | Nielsen | 382/218 |
| 6,647,473 | B1 | 11/2003 | Golds | |
| 6,708,227 | B1 | 3/2004 | Cabrera | |
| 6,820,099 | B1 | 11/2004 | Huber | |
| 6,993,539 | B2 * | 1/2006 | Federwisch et al. | 707/201 |
| 7,013,373 | B2 * | 3/2006 | Mimatsu et al. | 711/162 |
| 7,069,401 | B1 * | 6/2006 | Noonan et al. | 711/162 |
| 2002/0049718 | A1 | 4/2002 | Kleiman et al. | |
| 2004/0093474 | A1 | 5/2004 | Lin et al. | |
| 2004/0153615 | A1 | 8/2004 | Koning et al. | |
| 2004/0181642 | A1 | 9/2004 | Watanabe et al. | |
| 2005/0187982 | A1 * | 8/2005 | Sato | 707/200 |
| 2006/0155946 | A1 * | 7/2006 | Ji | 711/162 |
| 2006/0236069 | A1 * | 10/2006 | Kalach et al. | 711/173 |

FOREIGN PATENT DOCUMENTS

WO    WO2004034197    4/2004

OTHER PUBLICATIONS

Netbackup 4.5 (Feature Pack 3) Backing Up Open Files: The Veritas Volume Snapshot Provider htt;://eval.veritas.com/downloads/edu/instructor_articles_052003.pdf.

(Continued)

*Primary Examiner*—Diane Mizrahi
(74) *Attorney, Agent, or Firm*—Workman Nydegger

(57) ABSTRACT

Described is a method and system by which storage reports are generated from a volume snapshot set, rather than from a live volume. A volume snapshot set includes a representation or copy of a volume at a single point in time. By scanning the snapshot, a consistent file system image is obtained. Scanning may take place by enumerating a volume's directories of files, or, when available, by accessing a file system metadata of file information (e.g., a master file table) separately maintained on the volume. With some (e.g., hardware-based) snapshot technologies, the snapshot can be transported to another computing system for scanning by that other computing system, thereby avoiding burdening a live system's resources when scanning. Accurate and consistent storage reports are thus obtained at a single point in time, independent of the number of volumes being scanned.

20 Claims, 5 Drawing Sheets

OTHER PUBLICATIONS

Backup and Restore Technologies for Windows http://www.informit.com/articles/article.asp?p+99985&seqNum=5.

Veritas Volume ManagerTM 3.2 http://ftp.support.;veritas.compub/support/products/VolumeManager-UNIX/vm32-admin240253.pdf.

* cited by examiner

GENERATING STORAGE REPORTS USING VOLUME SNAPSHOTS

FIELD OF THE INVENTION

The invention relates generally to computer systems, and more particularly to computer files and storage.

BACKGROUND

Computer system administrators want to monitor the content that is stored on the computer systems for which they are responsible. This is necessary for various reasons, including understanding how existing storage is utilized, defining and implementing storage policies, and adjusting the storage policies according to usage growth.

Administrators use storage reports to help monitor storage on file servers and other servers, anticipate storage needs, analyze emergency situations and take preventive and/or corrective actions. For example, an administrator may want to see a sorted list of all files larger than one-hundred megabytes on a given namespace, sorted by size, and with summary information on totals. Another such report may provide summary information for each file type (e.g., "Media Files") on a given namespace, including the one-hundred largest files within each file type category. Thus, storage reports help an administrator identify inefficient use of storage, implement mechanisms to prevent future misuse, and monitor usage patterns and utilization levels in general.

While storage reports provide valuable functionality, generating the storage reports has a number of challenges. In general, to generate a storage report requires a traversal of the file system mounted on a storage volume, which may be accomplished by an enumeration of the files, e.g., via a "find-first, find-next" traversal of the volume's directories. The end result may not be a complete traversal, however, because some files may be opened for exclusive access. Further, for typical types of volumes on which storage reports are run, (e.g., file servers), the amount of data is very large, and thus the scan takes a significant amount of time. Because of the scanning time, changes may be being made to files as the scan is occurring, and the amount and types of changes may be significant. For example, one file may appear twice if it is moved during the scan, while another file may not be found at all. Scanning by traversing the file-system metadata (for example, the Master File Table for the Microsoft® NTFS file system or some other database-like structure) is almost impossible because this metadata keep changing during the scan.

As a result, the storage report or reports may contain possibly significant inconsistencies and inaccuracies, which may mislead the administrator. Ordinarily, the greater the amount of live user activity, and/or the greater the amount of data being scanned, the greater the number of inconsistencies and inaccuracies will be, whereby the problems increase when multiple volumes are scanned as part of generating the report. Still further, the generation of the storage report can heavily burden a computer system's processing and I/O resources, whereby the system's performance may be degraded to an undesirable level.

What is needed is a better way to generate storage reports that provides an administrator with consistent and accurate information. The consistency and accuracy should be independent of the live activity, amount of data and/or number of volumes being scanned, and in general any adverse impact on the system's performance caused by the storage report generation should be able to be mitigated.

SUMMARY OF THE INVENTION

Briefly, the present invention is directed towards a method and system by which storage reports are generated from one or more volume snapshots (a volume snapshot set) rather than the volume itself, wherein a volume snapshot (sometimes referred to as a shadow copy) comprises a representation or copy of a volume at a single point-in-time. A snapshot set can span multiple volumes, providing a single point-in-time state of a multiple volume computing environment.

By scanning the snapshot set, a consistent file system image is obtained, because each snapshot is read only. In addition, the files on the snapshot can be opened even if the corresponding files on the original volume are opened for exclusive access. This ensures a consistent file system scan, including when the scan is done by enumerating the various files in a directory traversal, or by accessing a file system metadata (e.g., master file table) of information about a volume's files. Scanning of the file system metadata is possible on the snapshot volume because the file-system metadata is flushed in a consistent manner during snapshot creation and because the snapshot itself is a read-only volume, whereby the file system metadata does not change.

Further, scanning the snapshot provides a single point in time for the entire report, which is very valuable for accurate trending, accuracy of the reported data (e.g., every files is reported once), and historical/statistical analysis. This single point in time may be across an entire namespace composed of multiple volumes.

Moreover, a snapshot can, if desired, be offloaded to another computing system, e.g., using a hardware-based snapshot mechanism. By transporting a snapshot to another system, the report generation may take place without overloading the original system, which may, for example, be a live server. In other instances, snapshots may be imported on the same machine, but their content may reside on another disk, therefore preventing an I/O load on the disk containing the "live" data.

Other advantages will become apparent from the following detailed description when taken in conjunction with the drawings, in which:

DETAILED DESCRIPTION

Exemplary Operating Environment

Figure 1:
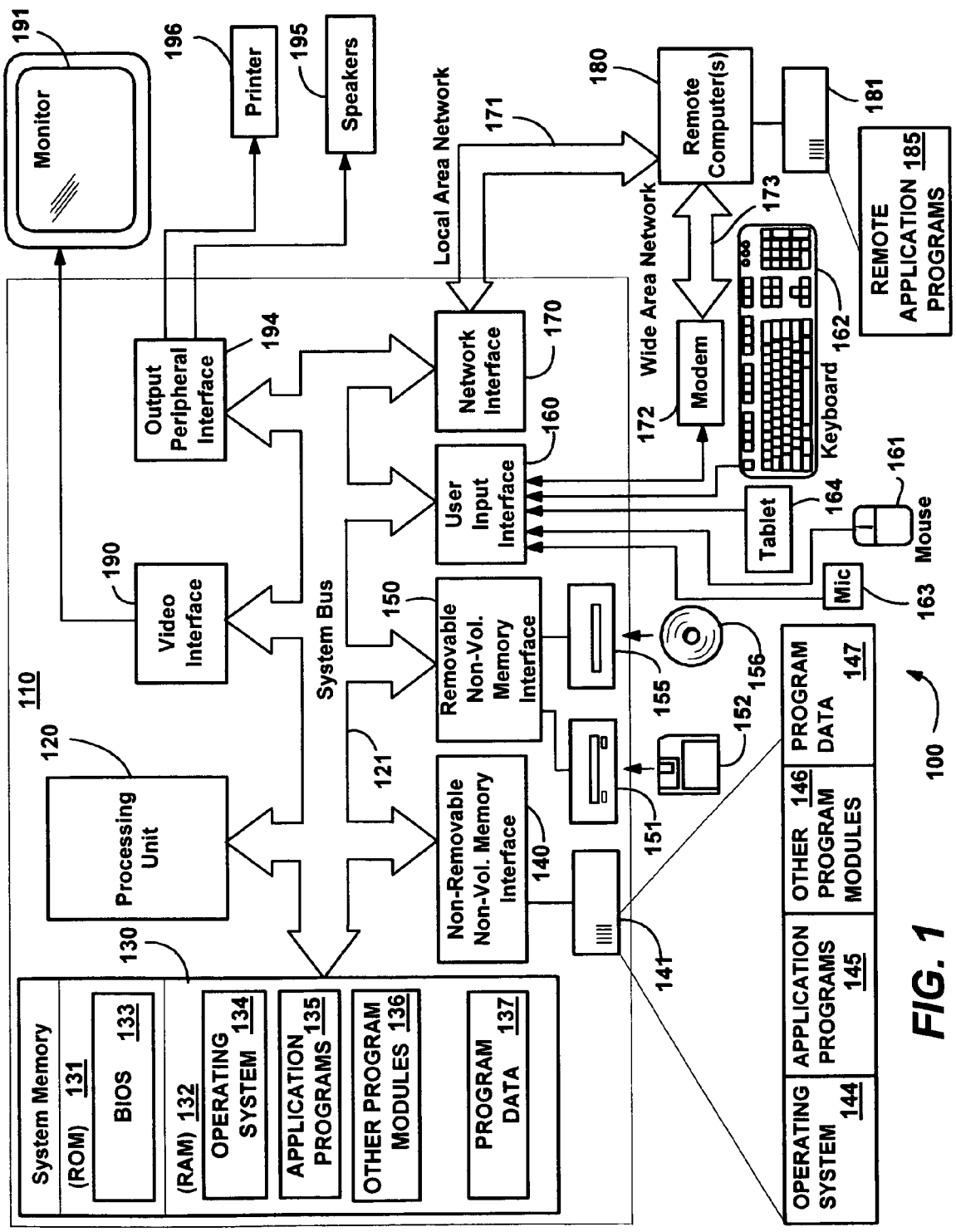
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Storage Reports Using Volume Snapshots

The present invention is generally directed towards a method and system by which volume snapshots, rather than live volumes, are scanned for generating storage reports. As will be understood, this may be accomplished by obtaining volume snapshots from virtually any volume snapshot technology, including those that presently exist and those not yet developed. Further, the present invention is based on adapting storage report generation technology to work with snapshots rather than live volumes, and is not limited to any particular storage report generator. Indeed, numerous ways to implement the present invention are feasible, and only some of the alternatives are described herein. For example, the present invention is primarily described below with reference to a storage report engine requesting a volume snapshot and a storage report engine (the same engine or one on a different machine) scanning the volume snapshot when returned. However, it is feasible to have another entity request the volume snapshot, and even to have a system in which the storage report engine is unaware of snapshot volumes, with an intermediary component that causes the storage report engine to scan a snapshot instead of a live volume. As such, the present invention is not limited to any particular examples used herein, but rather may be used various ways that provide benefits and advantages in computing in general.

Figure 2:
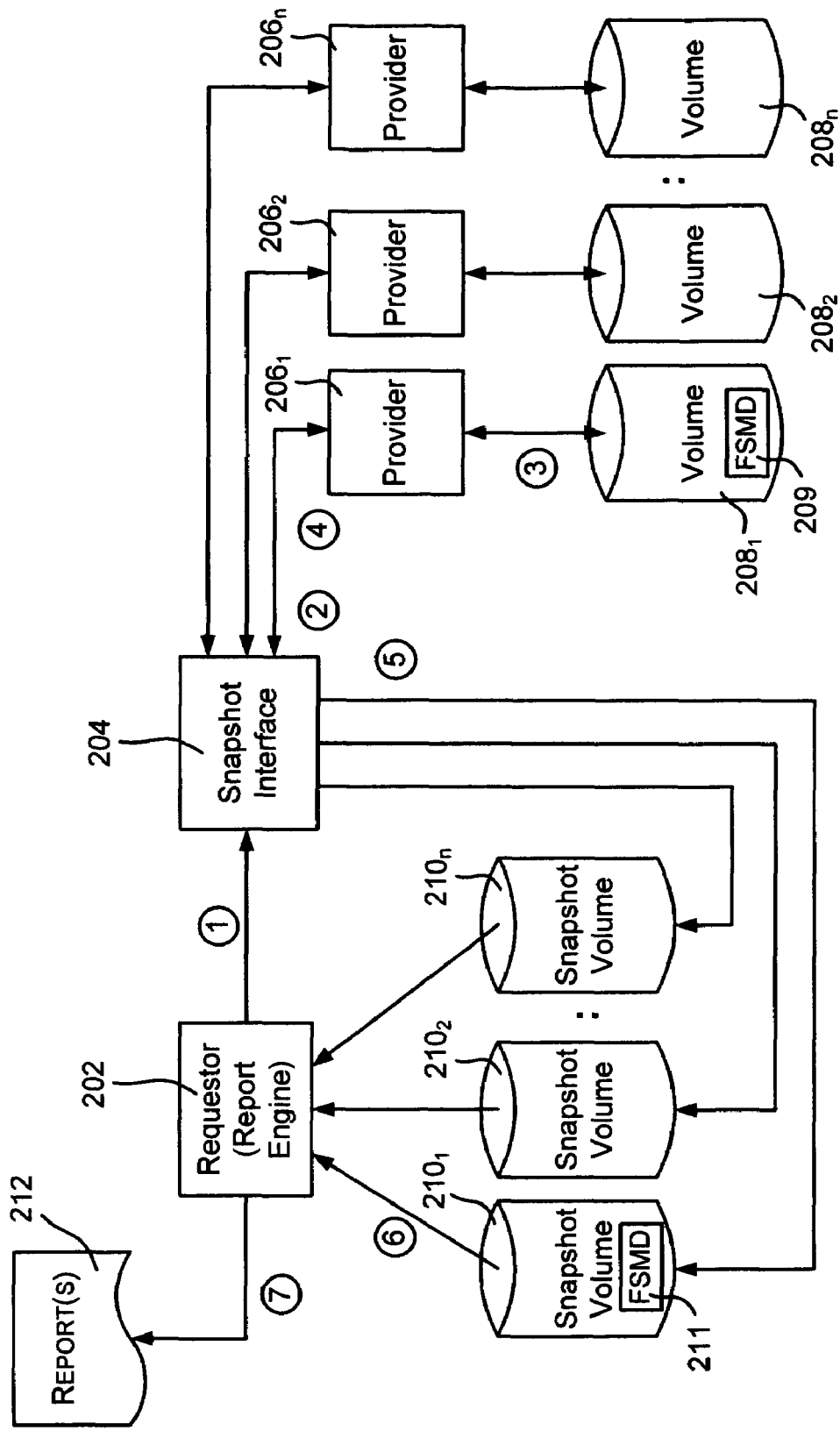
FIG. 2 is a block diagram representing a report generation engine as a "snapshot requester" that requests a snapshot set of one or more volume snapshots from which to generate a storage report, in accordance with various aspects of the present invention.

Turning to FIG. 2, there is shown a block diagram that represents some example components that may be interconnected to implement the present invention. In one example implementation, a storage report engine 202, which may provide a user interface, or may be executed by a command line or other program, receives parameters for creating a storage report set of one or more storage reports. An administrator may specify paths for which a report is desired; by way of example, a user or program may request that a storage report gather information from a list of namespace roots, such as {C:\, D:\foo and E:\bar\}. Note that volume mount points, in which a user mounts a volume in a directory, typically for using a pathname instead of a drive letter, are supported.

The administrator may also specify one or more file-related (metadata) filtering criteria to limit the report, e.g., files more than two years old, media files more than ten megabytes in size, and so forth. The report may be scheduled or created on demand.

In accordance with an aspect of the present invention, instead of scanning live storage volumes to generate the report, the requester 202 (the storage report engine or some other entity) requests to obtain volume snapshots for scanning. To this end, the requester 202 checks the namespace roots and extracts a volume list, which includes all the volumes that need to be scanned for producing the report, e.g., {C:\ and D:\}. Volume mount points may also be scanned, e.g., an administrator may specify a report for a namespace root E:\aaa\bbb, where E:\aaa is a mount-point volume, as well as a namespace root E:\, where E:\aaa and E:\bbb are two mount point volumes; in this case, the report engine will create three snapshots: for the E:\ volume, E:\aaa volume and E:\bbb volume. Note that as used herein, the term "volume" will also include volumes that are mount point volumes. In one implementation, namely a Windows®-based volume snapshot service (such as the Volume Shadow Copy Service), this may be accomplished by calling an API, AddToSnapshotSet of a snapshot interface 204, for each one of the volumes. In this exemplary implementation, when the list is built, the request is made via the snapshot interface 204. In FIG. 2, the snapshot request is represented by the circled arrow labeled with circled numeral one (1).

In turn, to perform the snapshot, the snapshot interface 204 invokes providers (the arrow labeled two (2)), essentially coordinating snapshots across one or more volumes (the arrow labeled three (3)). As represented in FIG. 2, providers $206_1$-$206_n$ are shown obtaining snapshots from at least three volumes $208_1$-$208_n$, although as little as one volume may be the subject of a snapshot in a give request. In general, the providers $206_1$-$206_n$ take the snapshots, as coordinated by system components tightly integrated with their respective file systems at a snapshot time to flush any buffered writes to disk, and hold further incoming writes until the snapshot is complete, (at which time held writes are released), thereby guaranteeing consistency on the snapshots. In this way, the exact state of one or more volumes is preserved in a snapshot volume set. In FIG. 2, corresponding snapshot volumes $210_1$-$210_n$, (e.g., of a volume set {snapC, snapD and snapE}) are shown being returned by the snapshot interface 204, as represented by the arrows labeled four (4) and five (5).

Once the snapshot volume set (volumes $210_1$-$210n$ in FIG. 2) is obtained, the storage report engine 202 can scan the snapshot volumes $210_1$-$210_n$ to generate a report 212, as represented in FIG. 2 via the arrows labeled six (6) and seven (7). Because the snapshots are read-only copies that do not allow opening a file for exclusive access, a successful file system scan may be accomplished regardless of whether the scan enumerates the file system files, or accesses a file system metadata (e.g., FSMD 211 in FIG. 2, which is copied from FSMD 209 during the snapshot) that contains records of metadata for each file system file and directory. Moreover, the report is generated from a single point in time, providing accurate data (e.g., every files is reported once), and facilitating historical analysis and accurate trending. The single point in time may be across an entire namespace composed of multiple volumes. Note that while the example implementation is presently limited to volumes of the same machine if a single point in time is required, this is only an example, and the present invention applies to volumes that are on different machines.

Indeed, it should be noted that the present invention is not limited to any particular snapshot technology. All that matters is that volume snapshots are available for scanning. Thus, both clone and copy-on-write type snapshot mechanisms may be used, as well as a hardware-based implementation and/or software-based implementation of snapshots. Notwithstanding, certain advantages and benefits may be obtained by using a hardware-based implementation type of snapshot mechanism, primarily in that a snapshot may be moved to another storage location, possibly on a different machine. The transportability of the snapshot is particularly efficient on storage area networks (SAN) storage mechanisms. As a result, the storage report may be generated without burdening the I/O resources of the original volume's machine, which may be the disk containing the "live" data. If a different machine, processor resources are likewise not adversely impacted.

Still further, in situations in which the file system metadata of file metadata is scanned rather than the individual files, the volume snapshot may be of the file system metadata, rather than the entire volume. Also, the content of a snapshot may be limited to the specific set of files that are referenced in the namespace list of a report. Thus, as used herein, "volume snapshot" and the like is not limited to a snapshot of the entire volume, but rather includes a snapshot of any subset of the volume that is sufficient for scanning for storage report generation.

Figure 3:
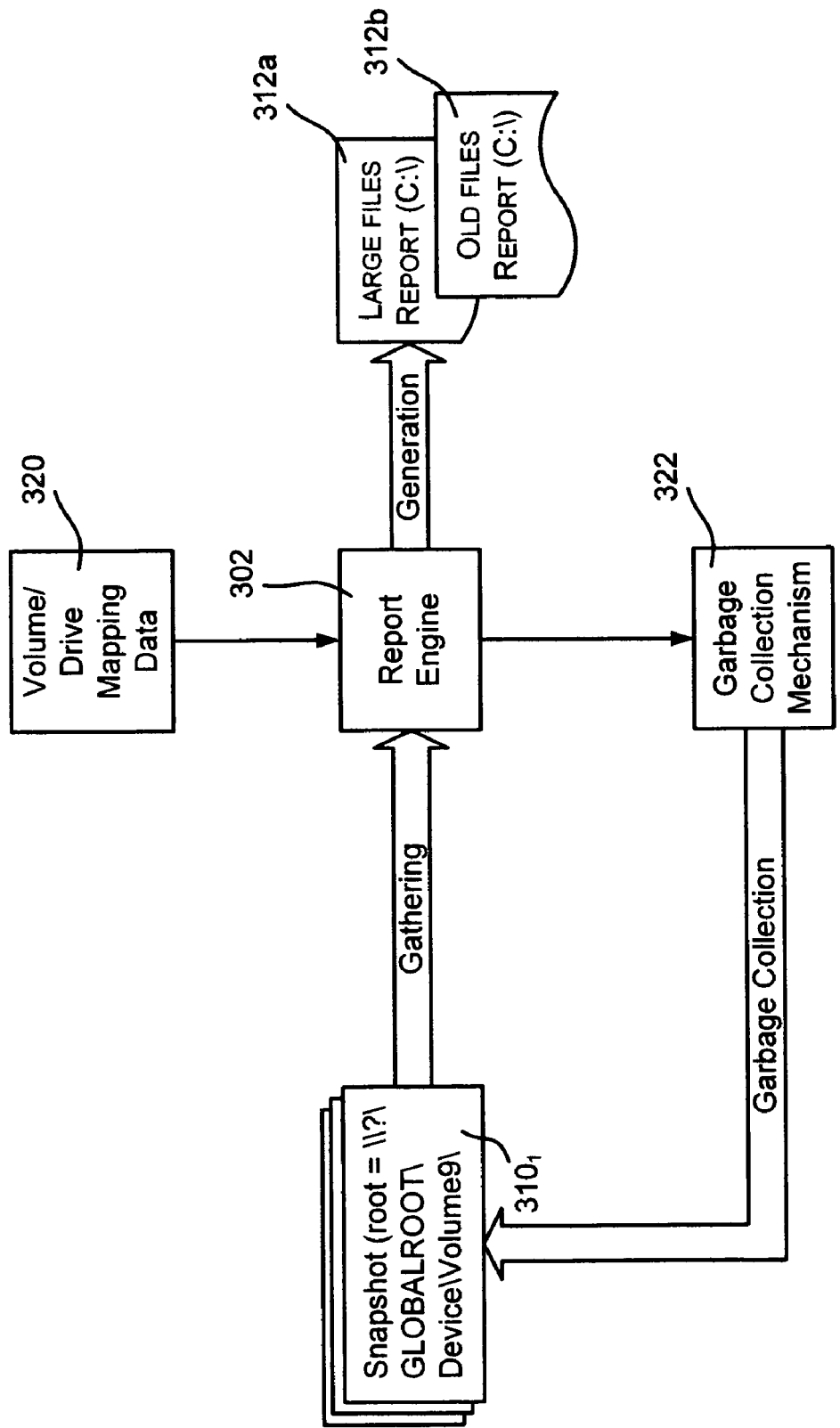
FIG. 3 is a block diagram representing generation of a storage report by scanning volume snapshots, in accordance with various aspects of the present invention.

FIG. 3 shows an example storage report generation process. Note that with a transportable snapshot set, the report engine 302 in FIG. 3 may be different from the requester 202 in FIG. 2, but may also be the same report engine. Moreover, even if on the same machine, the requester may be a different entity from the report engine.

As shown in FIG. 3, the snapshot volume may have a different actual name from the user-recognized name. For example, the name returned for the volume snapshot may not be what the user expects to see when reading a report. Thus, the original names, whether drive letters or volume mount points, are maintained in volume/drive mapping data 320. To report the pathname that the administrator expects, the report engine 302 obtains the I/O path for the snapshot volumes. With a Windows®-based snapshot mechanism, this is done via a GetSnapshotProperties API. Because the volume/drive mapping data 320 preserves the original volume name, during report generation, the report engine 302 substitutes the corresponding (and user-expected) pathname into the report. In the example of FIG. 3, the path for volume "c:\" (snapshot copy "snapC") is shown as \\?\GLOBALROOT\Device\HarddiskVolume9, restored to "c:\" in the reports.

The report engine 302 starts the scan, essentially gathering the data from the report by scanning the snapshots. As described above, there are no exclusively open files, and therefore no sharing violations, and nothing changes during the scan (e.g., files are not moved, file metadata does not change, and so forth).

For every file that matches the filtering criteria, the report engine translates the scanned path to the original path. For example, using the example path in the snapshot $310_1$, a file named \\?\GLOBALROOT\Device\HarddiskVolume9\foo\a.mp3 matches filtering criteria, (e.g., is one of the one-thousand largest files in the namespace), the report engine 302 will report the file path as c:\foo\a.mp3. Thus, despite scanning the snapshot volume, the file path is reported with the original volume file path.

In this manner, the file data is collected, and the reports generated, such as the "Large Files" report 312a, and the "Old Files" report 312b in FIG. 3. Once the scan is done, the snapshots may be deleted if not needed for another purpose, and the report engine (e.g., via a garbage collection mechanism 322) deletes the volume snapshot set.

Figure 4:
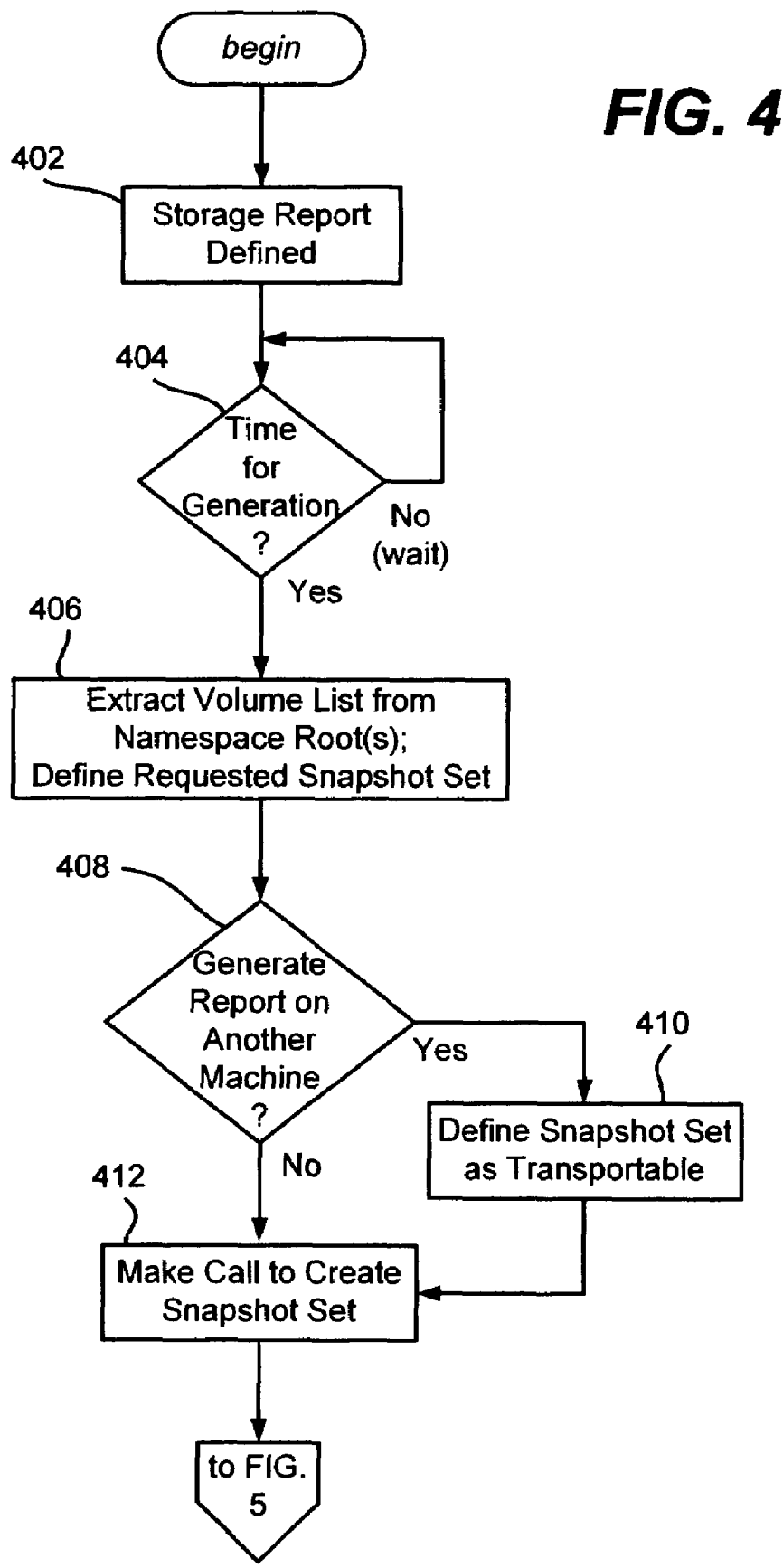
FIGS. 4 and 5 comprise a flow diagram generally representing example steps for requesting a volume snapshot set and generating storage reports from one or more volume snapshots in the volume snapshot set, in accordance with various aspects of the present invention.
Figure 5:
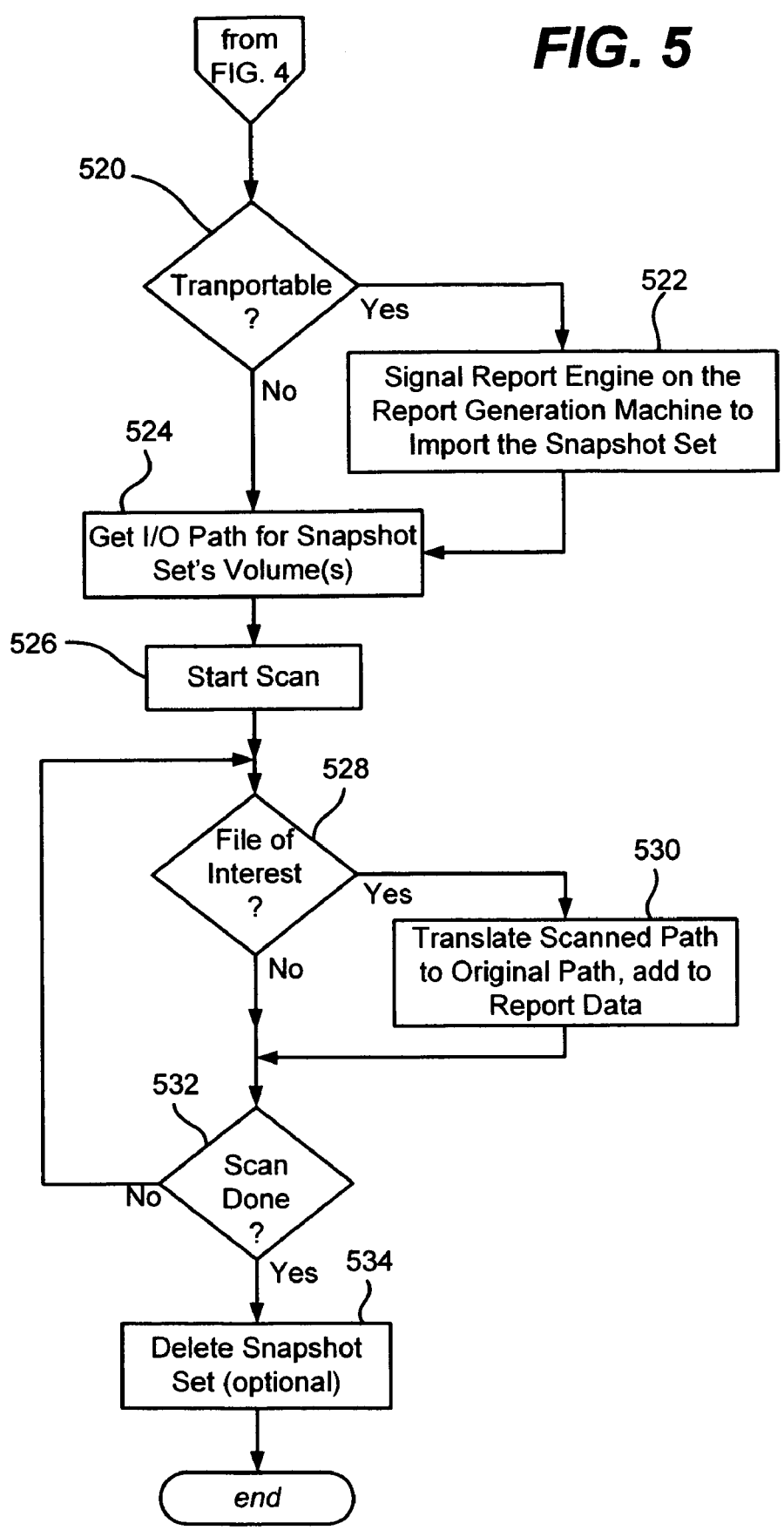

Turning to an explanation of the operation of the present invention and by way of summary with reference to FIGS. 4 and 5, the report generation process generally begins when a user or application program defines (step 204) a storage report that needs to gather information from a list of namespace roots. As described above, the report may be scheduled for generation, or created on demand, and thus step 404 represents waiting for the appropriate time; (this is shown in FIG. 4 as a loop, but may be an event-triggered operation). Note that scheduling allows different storage report requests (e.g., from different sources or made at different times) to be handled in a single scan, as generally described in copending U.S. patent application Ser. No. 11/107,977, entitled, "Method and System for Efficient Generation of Storage Reports" filed concurrently herewith, assigned to the assignee of the present invention and hereby incorporated by reference in its entirety.

As represented via step 406, at the scheduled time for generation, or immediately if on-demand, the report engine checks the name-space roots and extracts a volume list, which includes the volumes that needs to be scanned for producing the report. This list corresponds to the defined set of volumes to snapshot, that will have its contents given to the snapshot mechanism (e.g., the interface and providers) to perform the snapshot. As described above, the report engine creates the requested set of snapshots to be obtained, essentially walking the snapshot list and calling the API to add those volumes to the set of snapshots to be taken. Note that it is equivalent to call a snapshot mechanism with multiple volumes as parameters, or with a pointer to a data structure identifying the volumes, either in advance or in conjunction with the snapshot request.

Step 408 represents determining whether the report is to be generated on the same machine, or on another machine. If another machine, step 408 branches to step 410 where the snapshot set is defined as transportable; this may be accomplished by a call to the snapshot API. Note that the administrator or program that is requesting the storage reporting operation may specify the machine. If transportable, the snapshots will be created, but not exposed to the machine making the request.

Step 412 represents the call to take the snapshot, which the snapshot mechanism performs, resulting in the snapshot set being completed. Step 520 of FIG. 5 determines whether the snapshots will be transported to another machine, or will be maintained on the requesting machine. If the snapshot set was created as a transportable snapshot set, step 520 branches to step 522 where the requesting report engine signals the report engine on the other machine (e.g., an agent on the report generation machine) to import the snapshot set onto that other machine. If the snapshot set is to be scanned on the same machine, step 520 instead branches to step 524.

Step 524 represents the report engine calling for the I/O path for the snapshot volumes (e.g., via the above-described GetSnapshotProperties API). With the path information, the report engine starts the scan, as represented by step 526.

Steps 528, 530 and 532 represent traversing the file system metadata of file metadata, if available, or enumerating the file system files, e.g., in a via a "find-first, find-next" traversal of the volume's files. The file system metadata scan is often faster, and also may be combined with a consistency check of the volume, but such records are only available on certain file systems, such as in the master file table (MFT) in Microsoft Corporation's NTFS technology. The scan of the file system metadata is possible because during the snapshot creation, the file system metadata is flushed to disk in a consistent manner and the snapshot volume itself is read-only; therefore, the file system metadata does not change. At step 528, for every "file of interest," that is, a file that meets the specified filtering criteria, the report engine translates the scanned path to the original path, as described above. Step 532 represents returning to step 528 until the scan is done, e.g., when all files or records have been scanned.

Once the scan is done, the report data is complete and may be output in some way. The snapshots may no longer be required; if so, the report engine may delete the snapshot set, as represented by optional step 534, and the process ends. Note that a storage report may be run on a snapshot set used for other purposes, e.g., an enterprise may make a nightly snapshot set for backup purposes, and a storage report run on that same snapshot set. Further, note that one implementation of the present invention allows an administrator to generate a report on an existing snapshot set, and can even help the administrator locate a recent one.

As can be seen from the foregoing detailed description, there is provided a method and system that uses snapshots of storage volumes to generate storage reports that provide consistent and accurate information. Because read-only snapshots are used, the amount of data and/or the number of volumes to be scanned do not affect the consistency and accuracy of the report, nor does live activity. The storage report generation can be offloaded to avoid burdening the live system having the volume or volumes.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment including a processor and a computer memory, a computer-implemented method comprising:
   receiving a request for a storage report that corresponds to a subset of files of a volume set, the volume set including those volumes and mount point volumes that are to be scanned to produce the storage report, the request including an indication of one or more specific volume set properties that are to be scanned for in a snapshot scan, the storage report including at least a portion of information corresponding to the results of the snapshot scan;
   determining the volume set of at least one storage volume from which the storage report is to be generated, the volume set including at least one live volume;
   calling a snapshot mechanism to request a snapshot set, the snapshot set comprising a volume snapshot for each storage volume of the set of storage volumes;
   scanning, using the computer memory, the snapshot set for files of the subset that have the one or more specific properties indicated in the request; and
   providing the scanned snapshot set to a storage report generator for generating a report, the storage report generator being configured to scan at least a portion of information in the snapshot that corresponds to information stored on the storage volume, such that the report is generated by scanning the snapshot set and without scanning the storage volume set including the at least one live volume, the report including the results of the specific properties scanned for in the snapshot scan, the report being generated from a single point in time regardless of the number of snapshot volumes scanned ensuring that each file is reported once and that accurate trending and historical analysis are provided.

2. The method of claim 1 wherein at least part of the subset of files is identified via user-provided criteria, and further comprising, filtering the files based on the user-provided criteria.

3. The method of claim 1 further comprising, translating a scanned path to an original path for at least one file of the subset.

4. The method of claim 1 wherein scanning the snapshot set comprises enumerating files.

5. The method of claim 1 wherein scanning the snapshot set comprises scanning metadata of at least one file system that maintains file metadata information.

6. The method of claim 1 wherein the request for the storage report is received at one computer system, wherein the storage report is to be generated on another computer system, and further comprising, defining the snapshot set as transportable prior to calling the snapshot mechanism.

7. The method of claim 1 wherein the request for the storage report is received at one computer system, wherein the storage report is to be generated on another computer system, and further comprising, initiating a report engine on the other computer system.

8. The method of claim 1 wherein receiving the request for the storage report comprises receiving at least one namespace on which the report is to be generated, and wherein determining a volume set comprises determining a volume list based on each namespace.

9. At least one computer-readable storage medium having computer-executable instructions, which when executed by a computer processor perform the method of claim 1.

10. The method of claim 1, further comprising the storage report generator generating a report using the scanned snapshot set.

11. The method of claim 1, further comprising offloading the scanned snapshot set to another computing system, such that the report generation occurs on the other computer system.

12. In a computing environment having a volume snapshot mechanism, a system comprising:
   a processor;
   a computer memory;
   a volume set of at least one storage volume, the volume set including at least one live volume;
   a receiver configured for receiving a request for a storage report that corresponds to a subset of files of a volume set, the volume set including those volumes and mount point volumes that are to be scanned to produce the storage report, the request including an indication of one or more specific volume set properties that are to be scanned for in a snapshot scan, the storage report including at least a portion of information corresponding to the results of the snapshot scan;

a caller configured for calling the volume snapshot mechanism to request a snapshot set, the snapshot set comprising a volume snapshot for each storage volume of the set of storage volumes;

a scanner for scanning, using the computer memory, the snapshot set for files of the subset that have the one or more specific properties indicated in the request; and a storage report generator for generating at least one storage report comprising information of files that meet at least one specified criterion by scanning the snapshot set, the storage report generator being configured to scan at least a portion of information in the snapshot that corresponds to information stored on the storage volume, such that the report is generated by scanning the snapshot set and without scanning the storage volume set including the at least one live volume, the report including the results of the specific properties scanned for in the snapshot scan, the report being generated from a single point in time regardless of the number of snapshot volumes scanned ensuring that each file is reported once and that accurate trending and historical analysis are provided.

13. The system of claim 12 wherein the storage report generator includes a translator configured for translating a scanned path to an original path for at least one file.

14. The system of claim 12 wherein the storage report generator includes an enumerator configured for enumerating files when scanning the snapshot set.

15. The system of claim 12 wherein at least one volume has associated file system metadata, and wherein the storage report generator includes an accessing module configured for accessing the file system metadata when scanning the snapshot set.

16. The system of claim 12 wherein the is on a first computer system, wherein the storage report generator is on a second computer system, and wherein the first computer system is coupled to the second computer system to indicate that the second computer system is to import the snapshot set.

17. The system of claim 12 wherein the snapshot set comprises at least one of a clone snapshot of each volume, and a copy-on-write snapshot of each volume.

18. At least one computer-readable storage medium having computer-executable instructions stored thereon, which when executed by a processor perform steps, comprising:

receiving a request for a storage report that corresponds to a subset of files of a volume set, the volume set including those volumes and mount point volumes that are to be scanned to produce the storage report, the request corresponding to a volume set of at least one storage volume from which the storage report is to be generated, and associated with information corresponding to the subset of files for which the report is to be generated, the request including metadata that indicates one or more specific volume set properties that are to be scanned for in a snapshot scan, the storage report including at least a portion of information corresponding to the results of the snapshot scan;

calling a snapshot mechanism to request a snapshot set, the snapshot set comprising a volume snapshot for each storage volume of the set of storage volumes, the storage volume set including at least one live volume;

scanning the snapshot set for files of the subset that have the one or more specific properties indicated in the metadata of the request; and receiving the snapshot set at a storage report generator for generating a report, the storage report generator being configured to scan at least a portion of information in the snapshot that corresponds to information stored on the storage volume, such that the report is generated by scanning the snapshot set and without scanning the storage volume set including the at least one live volume, the report including the results of the specific properties scanned for in the snapshot scan, the report being generated from a single point in time regardless of the number of snapshot volumes scanned ensuring that each file is reported once and that accurate trending and historical analysis are provided.

19. The computer-readable storage medium of claim 18 having further computer-executable instructions, comprising, scanning the snapshot set at the storage report generator to produce a report, including, for each volume, accessing file system metadata of file information when available, and enumerating files when file system metadata is not available.

20. The computer-readable storage medium of claim 18 wherein the storage report generator is on a different computing system from the computing system having the volume set, and having further computer-executable instructions, comprising, calling the snapshot mechanism with information indicating that the snapshot set is to be transported to the computing system having the storage report generator.

* * * * *